United States Patent [19]

Rice

[11] Patent Number: 5,520,825

[45] Date of Patent: May 28, 1996

[54] OIL-WATER SEPARATOR

[75] Inventor: Warren M. Rice, Mitchell, S. Dak.

[73] Assignee: McTighe Industries, Inc., Mitchell, S. Dak.

[21] Appl. No.: 148,370

[22] Filed: Nov. 8, 1993

[51] Int. Cl.$^6$ ................................................. C02F 1/40
[52] U.S. Cl. ........................... 210/802; 210/519; 210/521; 210/540; 210/DIG. 5
[58] Field of Search .................................. 210/801, 802, 210/803, 519, 521, 532.1, 538, 540, DIG. 5

[56] References Cited

U.S. PATENT DOCUMENTS

| | | | |
|---|---|---|---|
| 995,521 | 6/1911 | Buhr | 210/540 |
| 2,090,813 | 8/1937 | Schumacher . | |
| 2,215,185 | 9/1940 | Lund . | |
| 2,611,488 | 9/1952 | Resan . | |
| 3,782,557 | 1/1974 | Pielkenrood | 210/521 |
| 3,849,311 | 11/1974 | Jakubek | 210/521 |
| 3,933,654 | 1/1976 | Middelbeek | 210/521 |
| 4,042,512 | 8/1977 | McCarthy et al. | 210/519 |
| 4,278,545 | 7/1981 | Batutis et al. | 210/521 |
| 4,333,835 | 6/1982 | Lynch | 210/522 |
| 4,337,561 | 7/1982 | James | 210/521 |
| 4,351,733 | 9/1982 | Salzer et al. | 210/521 |
| 4,385,986 | 5/1983 | Jaisinghani et al. | 210/521 |
| 4,396,508 | 8/1983 | Broughton | 210/522 |
| 4,422,931 | 12/1983 | Wolde-Michael | 210/519 |
| 4,722,800 | 2/1988 | Aymong | 210/519 |
| 4,747,948 | 5/1988 | North | 210/521 |
| 4,802,978 | 2/1989 | Schmit et al. | 210/521 |
| 4,925,563 | 5/1990 | Omori et al. | 210/532.1 |
| 5,108,609 | 4/1992 | Burt | 210/532.1 |
| 5,132,011 | 7/1992 | Ferris | 210/521 |
| 5,204,000 | 4/1993 | Steadman et al. | 210/519 |

Primary Examiner—Christopher Upton
Attorney, Agent, or Firm—Bacon & Thomas

[57] ABSTRACT

A compact gravitational oil-water separator particularly adapted for use in small drainage systems in order to avoid pollution to the environment is provided with a plurality of separating components housed within a tank. More specifically, these components include a baffle member which provides initial separation of an incoming oil-water flow stream and distributes the flow substantially across the entire width of the tank. After the flow impinges the baffle member, the flow is directed downward towards a sediment bucket which captures any large particles separated from the flow and then the flow is directed upwardly at an angle through a coalescer unit. After exiting the coalescer unit, the flow is guided over a separation plate and then is re-directed, in a reverse direction, to an inlet opening of an outlet flow passage. By reversing the fluid flow, substantially the entire tank is utilized in the separation process. All of the separating components are removably mounted within the tank to ease maintenance thereof. Finally, a skimmer unit and an oil-water interface sensing/indicating unit can also be provided.

20 Claims, 4 Drawing Sheets

OIL-WATER SEPARATOR

BACKGROUND OF THE INVENTION

1. Field of the Invention

This invention pertains to an apparatus and method for gravitationally separating oil and water. The invention has particular use in clarifying run-off or drainage water so as to avoid pollution in streams, lakes or the like. The term "oil-water" as used herein is intended to cover a wide range of immiscible liquids and possibly light weight solids. In general, the invention is applicable to the separation of immiscible liquids of different specific gravities and which are therefore susceptible to gravity separation.

2. Discussion of the Prior Art

Many devices have been proposed for gravitationally separating oil and other lightweight materials from run-off or drainage water to avoid pollution of streams lakes or the like. Such apparatuses are often installed underground and are adapted for handling oil-water run-off from rain or hose downs at gasoline service stations, truck stops, parking lots, shopping mall areas, roadways, bus garages, petroleum plants and the like. Such known apparatuses have not been completely satisfactory, mainly due to the difficulties associated with maintenance of the apparatus and/or the ability of the apparatus to adequately separate the immiscible liquids while still maintaining a relatively compact size. Actually, such known apparatuses often perform an adequate separation function when working on a batch basis, however, the same apparatuses have not been satisfactory for continuous flow processing at a rate commensurate with the amount of run-off flow generally developed for separation.

SUMMARY OF THE INVENTION

It is an object of the present invention to provide a compact gravitational oil-water separator for use in a small drainage system that is subject to a continuous flow or intermittent flow basis.

It is another object of the present invention to provide an oil-water separator that requires a minimum of maintenance, but which also is designed with removable components to aid in servicing the apparatus when necessary.

These and other objects of the present invention are achieved by providing an oil-water separator that includes a tank within which various separator devices are designed and mounted such that a continuous or intermittent gravity flow of immiscible liquids will be subjected to both horizontal and vertical flow and which can effectively separate the immiscible liquids with full use of fluid gravitational differentials, laminar flow, coalescence, undulation, fluid impingement, flow reversing and tertiary separation within a single containment tank. By utilizing these separation methods and the complete volume of the containment tank, an efficient separation system can be provided in a compact tank that can handle a reasonable rate of continuous flow.

When the flow of oil-water enters the separator tank, the flow is directed to impinge upon a baffle member that is mounted at an angle to the vertical within an upper portion of the tank. Instantly, large oil particle separation and solid separation occurs while the flow is distributed and directed across the entire width of the tank. The fluid then continues vertically downward which causes separated solids to accelerate and to be collected in a sediment bucket positioned below the baffle member. The direction of the fluid flow is then changed to an upward direction and the flow is caused to pass through a coalescer unit composed of a plurality of vertically spaced and upwardly sloping corrugated plates.

The laminar flow leaving the parallel plates will contain coalesced oil particles and will be guided, at an angle, upwardly by a tertiary separation plate to a point where, in gentle return to downward vertical flow, the coalesced particles are wiped free of the flow by contact with an air/water or oil/water interface of the separator. The flow is then forced to reverse in direction toward an opening of an outlet flow passage. Remaining free oil particles in the flow will rise, impinge each other and be captured in a small alcove defined by the separation plates. A vertical pipe conducts the oil particles from the above towards the oil interface at the top of the separator. The flow again reverses direction before entering the outlet flow passage and is directed to a discharge outlet.

The oil-water separator according to the invention is capable of effectively separating immiscible liquids on a continuous basis with essentially no supervision and minimum maintenance. When maintenance is required, the separating components can be readily removed from the tank.

Additional objects, features and advantages of the invention will become more evident from the following detailed description of a preferred embodiment thereof, when taken in conjunction with the following drawings wherein like reference numerals refer to corresponding parts in the several views.

DETAILED DESCRIPTION OF THE PREFERRED EMBODIMENT

Figure 1:
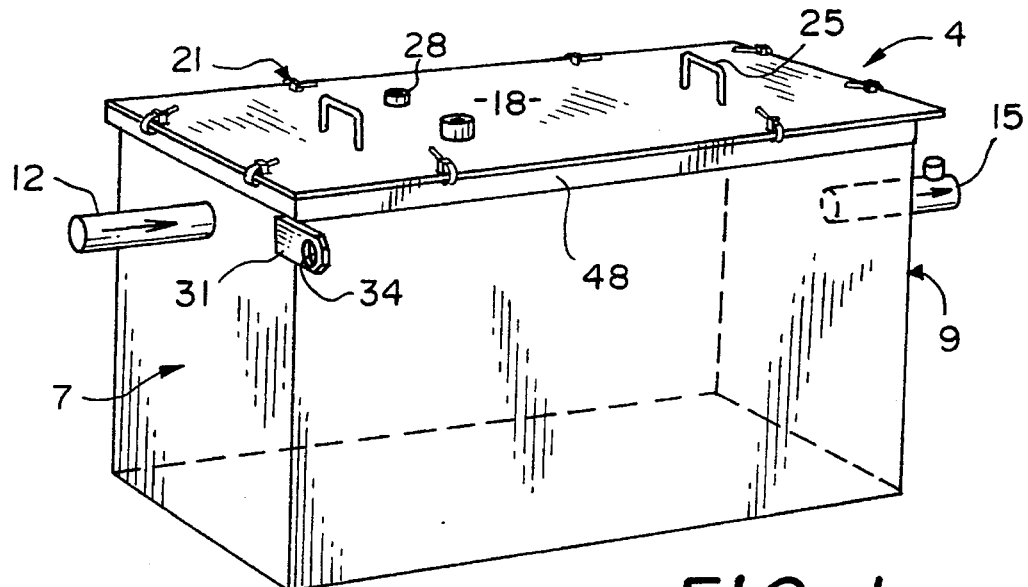
FIG. 1 is a schematic, perspective view of the oil-water separator of the present invention.

With initial reference to FIG. 1, the oil-water separator of the present invention includes a tank generally indicated at 4. Tank 4 includes a first end 7 and a second end 9. Although tank 4 is generally indicated to be rectangular in shape, it should be readily recognized that tank 4 can take the form of various shapes including cylindrical. Tank 4 is adapted to receive a supply of oil-water to be separated through an inlet 12 that projects through an upper portion (not labeled) of tank 4 at first end 7. This oil-water flow is adapted to be separated within tank 4 such that clarified water is delivered out of tank 4 through a discharge outlet 15 extending from the upper portion of tank 4 at second end 9.

Figure 2:
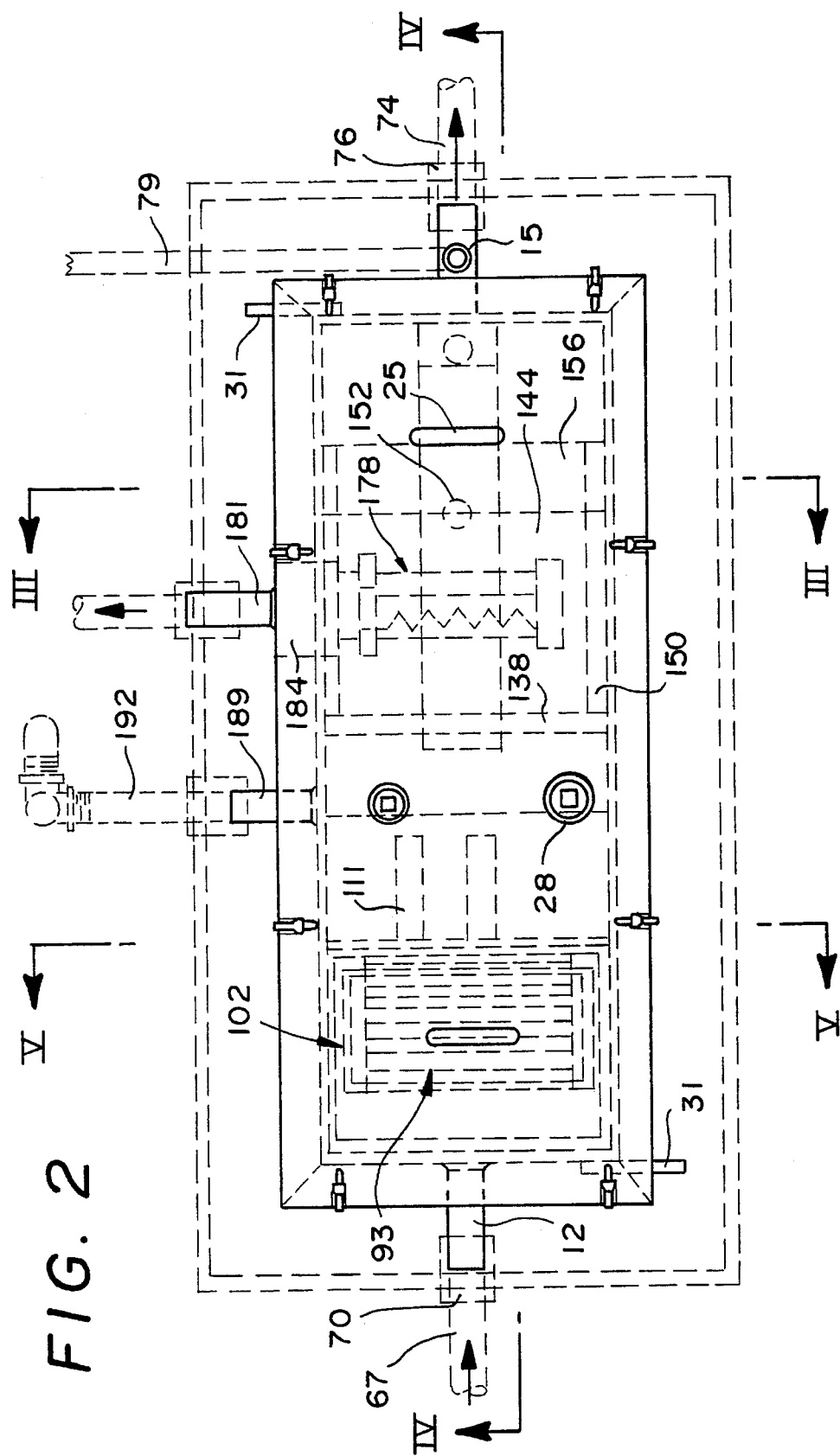
FIG. 2 is a top view of the oil-water separator of the invention shown mounted underground and with its internal separating components shown in phantom.

A cover member 18 is removably secured upon tank 4 by means of a plurality of clamps 21 in the manner which will be more fully discussed below. Cover member 18 is provided with a pair of spaced handles 25. In addition, various holes can be provided within cover member 18 which are adapted to receive plugs 28. Once plugs 28 are removed, tank 4 can be visually inspected without the need to entirely remove cover member 18. Tank 4 is also provided with at least one lug 31 that is fixedly secured thereto and which includes a throughhole 34. Lug 31 provides a connection member that enables tank 4 to be positioned by means of heavy machinery. As best shown in FIG. 2, two such lugs 31 are preferably provided at opposing corners of tank 4. In the preferred embodiment, tank 4 and cover member 18 are formed from steel, however, it should be readily understood that various materials, including polymeric materials, could be utilized without departing from the spirit of the invention.

Figure 3:
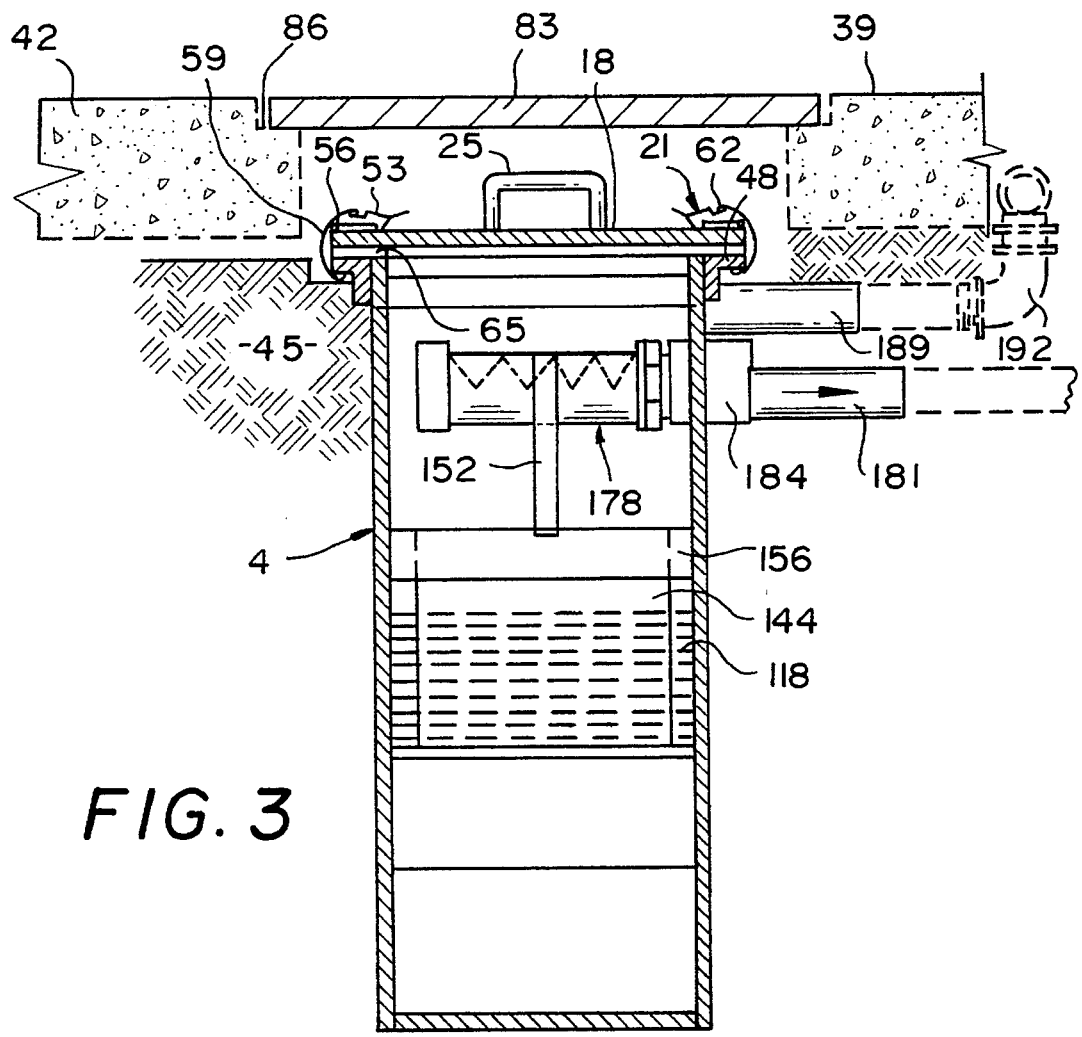
FIG. 3 is a cross-sectional view taken along line III—III of FIG. 2.
Figure 4:
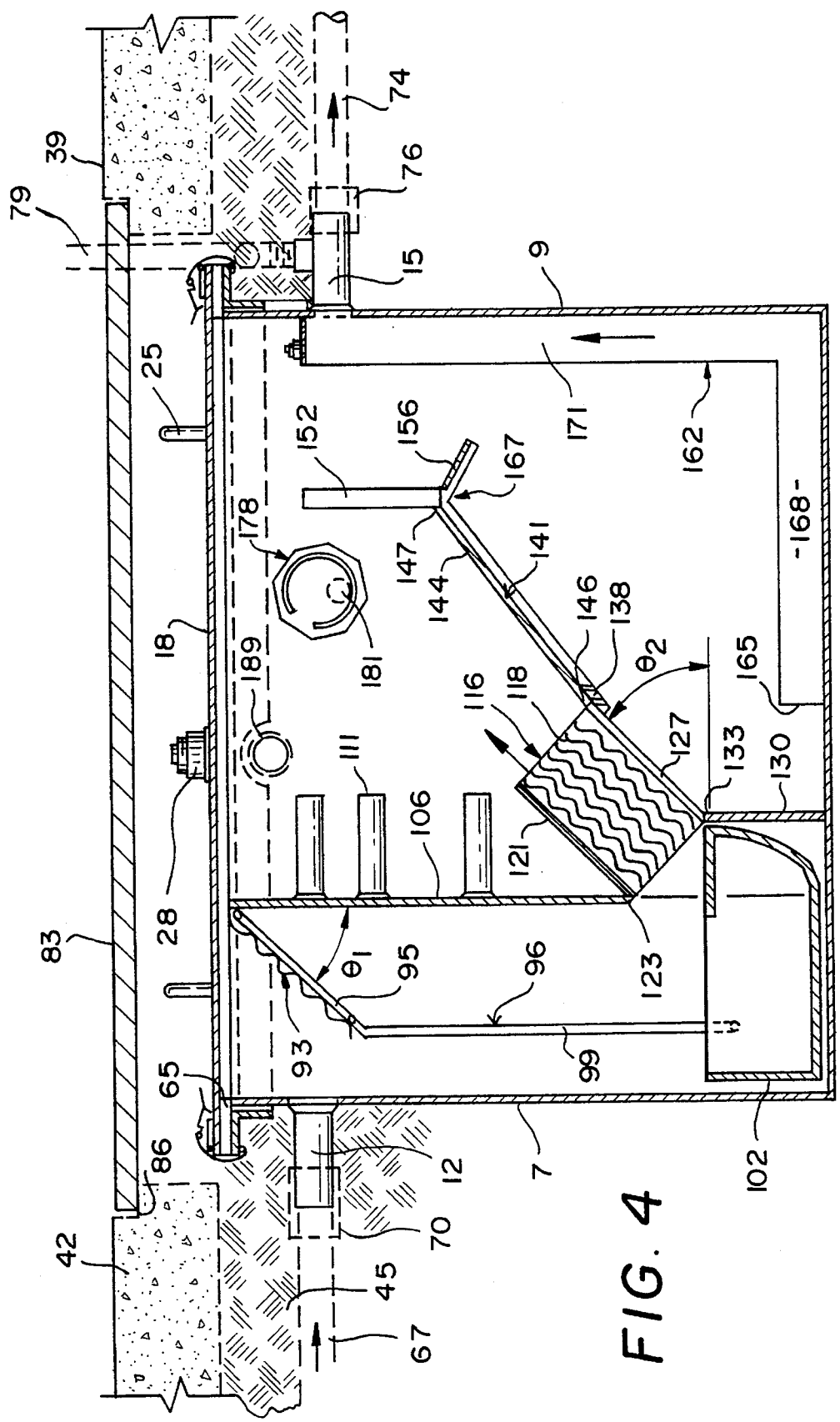
FIG. 4 is a cross-sectional view generally taken along line IV—IV of FIG. 2.
Figure 5:
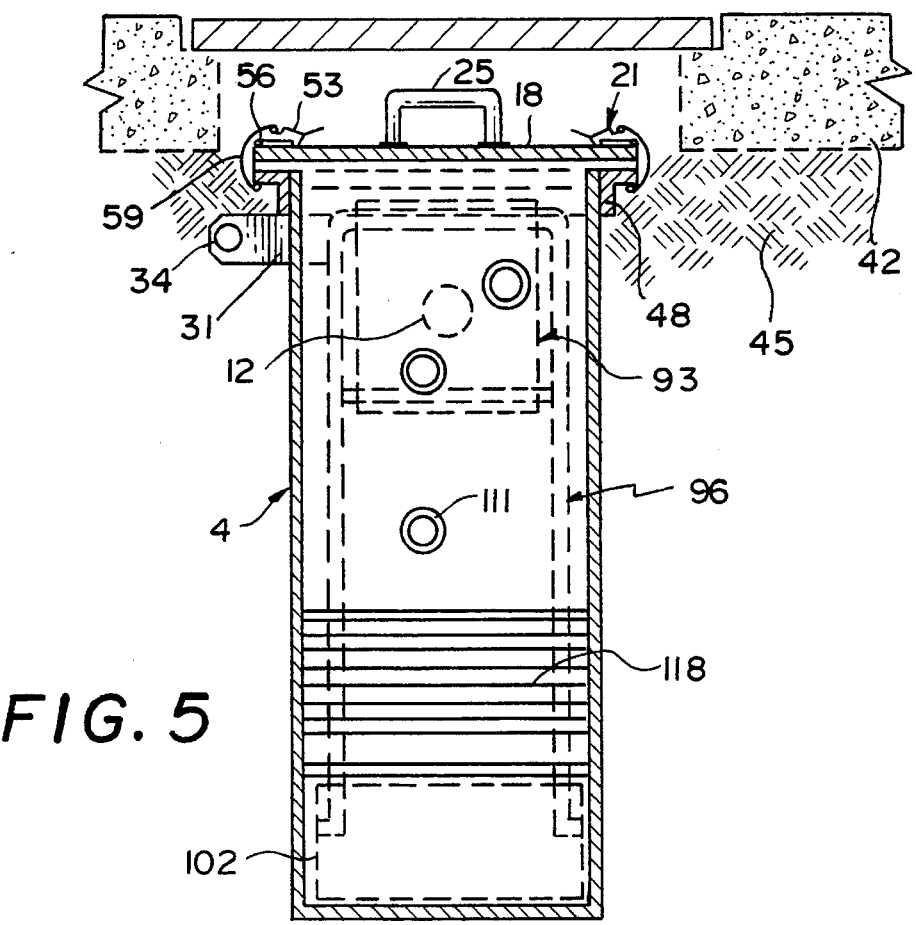
FIG. 5 is a cross-sectional view generally taken along line V—V of FIG. 2.

Reference will now be made to FIGS. 3 and 4 in describing the manner in which tank 4 is mounted underground. In these figures, reference numeral 39 indicates ground level that is defined by an upper surface of a concrete slab 42. Below concrete slab 42 the earth 45 has been dug out to accommodate tank 4. At an uppermost portion of tank 4, just below cover member 18, an L-shaped plate 48 is permanently secured to tank 4 and extends about its upper perimeter. L-shaped plate 48 cooperates with clamps 21 to secure cover member 18 in place. More specifically, each clamp 21 includes a lever 53 that is pivotally mounted to cover member 18 by means of a pin 56. A spring clip 59 is pivotally secured at an upper end thereof (not labeled) to lever 53 by means of a pin 62 and includes a lower end (not labeled) that is adapted to extend beneath and engage L-shaped plate 48 such that when lever 53 is in the position shown in these figures, cover member 18 is secured in place. However, if lever 53 is pivoted about pin 56, spring clips 59 will be readily disengaged from L-shaped bracket 48 such that cover member 18 can be removed from upon tank 4 by means of handles 25. In the preferred embodiment shown, a sealing member 65 is secured about the bottom perimeter of cover member 18 and is adapted to engage L-shaped plate 48 to seal tank 4 when cover member 18 is secured in the manner outlined above.

Inlet 12 is adapted to receive the oil-water flow from a supply line 67 that is connected to inlet 12 by means of a coupling 70. In a similar manner, discharge outlet 15 is adapted to be attached to a discharge line 74 by means of a coupling 76. Discharge outlet 15 is also further provided with a vent line 79 as best shown in FIGS. 2 and 4.

Although not clearly shown in the Figures, tank 4 preferably rests upon earth 45 so as to be supported from below. After tank 4 is set in place, additional earth 45 can be placed about tank 4 for stabilization purposes. Finally, a cover plate 83 can be set within recesses 86 formed in concrete slab 42 so as to completely cover tank 4 and to provide a surface level with ground surface 39.

Reference will now be made to FIGS. 2–5 in describing the internal separation components provided within tank 4 and the manner in which the separator of the present invention operates. Mounted in the upper portion of tank 4, adjacent first end 7 and juxtaposed to inlet 12, is a baffle member 93. Baffle member 93 comprises a transversely corrugated plate that slopes upwardly at an angle of $\Theta_1$ with respect to the vertical. Preferably, the angle $\Theta_1$ is within the range of 30°–60°. In this position, the oil-water flow through inlet 12 will be directed upon baffle member 93. Instantly, larger oil particles and solids will be separated from the flow upon impingement with baffle member 93 while the remainder of the flow will change in direction such that the flow is distributed across substantially the entire width of tank 4. Baffle member 93 is actually mounted upon a sloped portion 95 of a handle unit 96. Handle unit 96 also includes a vertical portion 99 that is secured to a sediment bucket 102 positioned within tank 4 below baffle member 93. After the oil-water flow is distributed by baffle member 93, the flow will continue vertically downward causing the separated solids to accelerate. These solids will be captured within sediment bucket 102 which can be emptied as required in the manner which will be more fully discussed below. At this point, it should simply be recognized that baffle member 93 and sediment tank 102 are both secured to handle unit 96. Baffle member 93 and sediment tank 102 are positioned in a portion of tank 4 generally referred to as a sludge chamber which is separated from a remainder of tank 4 by means of a dividing wall 106. Dividing wall 106 is generally vertically arranged and includes a plurality of vertically spaced flow tubes 111 which permit oil particles that tend to float relative to the majority of the oil-water flow to pass out of this sludge chamber.

Positioned at a lower portion of tank 4, above sediment tank 102, is a coalescer unit 116. Coalescer unit 116 includes a plurality of vertically spaced, corrugated plates 118. In general, coalescer unit 116 slopes upwardly from adjacent sediment bucket 102 towards second end 9 of tank 4. Coalescer unit 116 includes an upper plate 121 that is fixedly secured to a lower end 123 of dividing wall 106 and a lower plate 127. A dividing wall extension 130 is vertically disposed within tank 4 adjacent sediment tank 102 and includes an upper end 133 that is fixedly secured to lower plate 127 of coalescer unit 116. The other end of lower plate 127 rests upon a support member 138 that extends across tank 4.

Coalescer unit 116 functions in a manner known in the art whereby the vertically spaced plates 118 direct a generally laminar flow upwardly within tank 4 to induce coalescence. Coalescer unit 116 is mounted within tank 4 at an angle of $\Theta_2$ with respect to the horizontal. This angle of inclination is preferably within the range of 20°–60°. Within coalescer unit 116, oil globules will rise the short distance between adjacent plates 118 to coalesce on the undersides of plates 118 and creep up plates 118 toward the outlet region of coalescer unit 116. Coalescence occurs when large oil droplets rising at a high rate of speed collide with smaller, slower droplets, as well as impinging upon the corrugated plate surface. The larger droplets which are formed combine again with small droplets to form even larger droplets which have an even higher associated rise rate.

The flow leaving coalescer unit 116 will be guided upwardly by means of a tertiary separation plate 141 including a first portion 144 that slopes upwardly towards second end 9 and the oil-water interface associated with tank 4. It has been found that contact with the layer of already separated oil according to this invention functions to wipe free some additional particles of free oil from the flow which might not otherwise have been separated. First portion 144 includes a lower end 146 that rests upon support member 138 and an uppermost end 147. Support member 138 actually constitutes a transversely extending member of an overall support arrangement provided within tank 4. The overall support arrangement is best shown in phantom in FIG. 2 and includes support member 138 and longitudinally extending members 150. Separation plate 141 is therefore actually supported upon support member 138 and longitudinally extending; members 150.

Extending through separation plate 141, at uppermost section 147 thereof, is a collection tube 152 which functions in a manner which will be more fully discussed below. Separation plate 141 further includes a second portion 156 which slopes downwardly for a predetermined distance from uppermost section 147 towards second end 9 of tank 4. As the flow exits coalescer unit 116 and is guided upwardly by means of separation plate 141, the coalesced oil droplets will rise while the remainder of the flow will be redirected along second portion 156 of separation plate 141. The flow is then directed to an outlet flow passage 162 including an inlet opening 165. As best shown in FIG. 4, inlet opening 165 is located rearward of uppermost section 147 of separation plate 141 and is actually located closer to first end 7 than second end 9 of tank 4. Due to this arrangement, the flow is caused to reverse in direction after separation plate 141 in order to enter inlet opening 165. This reverse flow will cause any remaining free oil particles in the flow stream to rise toward a bottom portion (not labeled) of separation plate 141 and be directed along separation plate 141 to an alcove 167 defined between first portion 144 and second portion 156 of separation plate 141. Collection tube 152 opens at alcove 167 and functions to guide these remaining free oil particles toward the oil-water interface at the upper section of tank 4.

By the time the flow enters inlet opening 165 of outlet flow passage 162, an effective oil-water separation process has been completed. The flow will be directed initially along a bottom portion of tank 4 within a first section 168 of outlet flow passage 162 and then along a second portion 171 of outlet flow passage 162 which extends along second end 9 of tank 4. Finally, second portion 171 of outlet flow passage 162 converges and directs the flow out of tank 4 through discharge outlet 15.

By this arrangement, an oil-water separator is provided which is capable of effectively separating immiscible liquids on a continuous basis for a generally small source drainage over reasonable extended time periods with minimum maintenance and little or no supervision. If maintenance is required, cover member 18 can be removed by unlatching clamps 21 such that spring clips 59 are disengaged from L-shaped plate 48. Following removal of cover member 18, separation plate 141 and collection tube 152 can be removed as a unit from tank 4. In addition, due to the interconnection between divider wall 106, divider wall extension 130, and plates 121 and 127, coalescer unit 116 can also be readily removed from tank 4 as a unit. Finally, since baffle member 93 is interconnected with sediment bucket 102 through handle unit 96, these components can be removed from tank 4 as a unit. This removability feature of the separation components incorporated in the separator of the present invention not only aids in effectively cleaning these components and removing particles collected within sediment bucket 102, but also provides for relatively unrestricted access to the interior of tank 4 if necessary.

Tank 4 can also be provided with a skimmer unit 178 that includes an associated skimmer outlet pipe 181 and coupling 184. In general, the structure and function of skimmer unit 178 is known in the art and therefore will not be described in detail herein. In addition, a vent pipe 189 that is joined to an extension pipe 192 (see FIG. 3) can be used to vent tank 4. Vent pipe 189 opens at or above the oil-water interface associated with tank 4.

Figure 6:
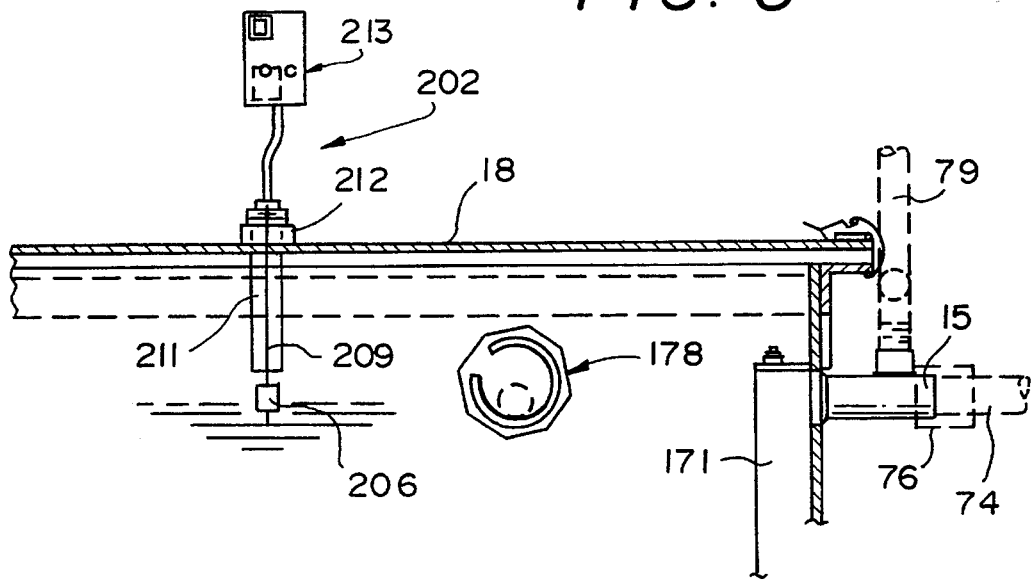
FIG. 6 depicts an enlarged sectional view of a portion of the separator shown in FIG. 4 with the inclusion of a supplemental indicating assembly.

Reference will now be made to FIG. 6 in describing an auxiliary feature of the oil-water separator of the present invention. FIG. 6 is actually an enlarged view of a portion of the arrangement shown in FIG. 4 and indicates the presence of an oil-water interface sensing/indicating unit generally indicated at 202. Unit 202 incorporates a float member 206 that hangs from a suspension member 209 positioned within a sleeve 211. Unit 202 is used to sense and indicate the level of the oil-water interface within tank 4 by determining the height of float member 206. The height of float member 206 is actually determined by sensing the position of suspension member 209 within sleeve 211 by a position sensor 212. The specific structure of position sensor 212 is not disclosed in this application since it is considered well known in the art and not an inventive aspect in this application. The output of position sensor 212 is supplied to an indicating panel 213 which can provide either an audible or visual indication/alarm regarding the height of the sensed oil-water interface.

Although described with respect to a preferred embodiment of the invention, it should be readily understood that various changes and/or modifications can be made to the invention without departing from the spirit thereof. In general, the invention is only intended to be limited by the scope of the following claims.

I claim:

1. An oil-water separator comprising:

a tank having first and second longitudinally spaced ends, a upper portion and a lower portion;

a baffle member positioned within said tank adjacent the first end thereof;

an oil-water flow inlet opening into the upper portion of said tank at a position juxtaposed to said baffle member so as to direct an oil-water flow against said baffle member;

a sediment bucket positioned in the lower portion of said tank below said baffle member;

a coalescer unit positioned downstream of said sediment bucket, said coalescer unit including a plurality of vertically spaced, substantially parallel corrugated baffle plates sloping upwardly from a coalescer inlet, adjacent the lower portion of said tank, to a coalescer outlet;

a separation plate including a section that slopes upwardly from said coalescer outlet toward the second end of said tank, said separation plate including an uppermost section; and an outlet flow passage terminating in a discharge outlet for said separator, said outlet flow passage having a passage opening located in the lower portion of said tank, closer to the first end of said tank than the uppermost section of said separation plate.

2. An oil-water separator as claimed in claim 1, further comprising a cover member removably attached to the upper portion of said tank, said baffle member sloping upwardly away from the first end of said tank toward said cover member.

3. An oil-water separator as claimed in claim 2, wherein said baffle member includes a surface portion, opposite said inlet, defining transversely extending corrugations.

4. An oil-water separator as claimed in claim 1, further comprising handle means fixed to said sediment bucket for use in removing said sediment bucket from said tank.

5. An oil-water separator as claimed in claim 4, wherein said baffle member is supported by said handle means within said tank.

6. An oil-water separator as claimed in claim 1, further comprising a dividing wall extending substantially vertically between said baffle member and said coalescer unit, said coalescer unit being mounted to, supported by and readily removable from said tank with said dividing wall.

7. An oil-water separator as claimed in claim 6, wherein said dividing wall has extending therethrough, above said coalescer unit, a plurality of vertically spaced pipes providing for oil transfer through said dividing wall and impingement coalescence of oil droplets.

8. An oil-water separator as claimed in claim 1, further including a collection tube extending through and upwardly from the uppermost section of said separation plate for guiding particles upward, away from said separation plate, toward an oil-water interface.

9. An oil-water separator as claimed in claim 1, wherein said separation plate further includes a section that slopes downwardly from the uppermost section of said separation plate toward the second end of said tank.

10. An oil-water separator as claimed in claim 1, wherein said outlet flow passage extends along the lower portion of said tank a predetermined distance and then upwardly at the second end of said tank to said water discharge outlet.

11. An oil-water separator as claimed in claim 10, wherein said passage opening is located closer to the first end of said tank than the second end thereof.

12. An oil-water separator as claimed in claim 1, further comprising skimmer means mounted in said tank above said separation plate.

13. An oil-water separator as claimed in claim 1, further comprising means for sensing and indicating the location of an oil-water interface within said tank.

14. An oil-water separator comprising:

a tank having first and second longitudinally spaced ends, an upper portion and a lower portion;

an inlet opening into the upper portion of said tank at the first end thereof for introducing an oil-water flow into said tank;

first separator means positioned within said tank, adjacent the first end thereof, juxtaposed to said inlet, said first separator means directing the oil-water flow generally downwardly within said tank;

second separator means positioned adjacent the lower portion of said tank and downstream of said first separator means, said second separator means directing the oil-water flow from the lower portion of said tank upwardly and toward the second end of said tank at a predetermined angle;

third separator means positioned downstream of said second separator means, said third separator means initially directing the oil-water flow from said second separator means upwardly toward the second end of said tank and then re-directing the flow in a reverse direction, generally downwardly and toward the first end of said tank; and an outlet flow passage terminating in a discharge outlet for said separator, said outlet flow passage having a passage opening located in the lower portion of said tank, closer to the first end of said tank than at least a portion of said third separator means.

15. An oil-water separator as claimed in claim 14, wherein said first separator means comprises a corrugated baffle member that slopes upwardly away from the first end of said tank and a sediment bucket positioned in the lower portion of said tank below said baffle member.

16. An oil-water separator as claimed in claim 15, further including means for interconnecting said baffle member and said sediment bucket whereby said baffle member and said sediment bucket can be readily removed from said tank as a unit.

17. An oil-water separator as claimed in claim 14, wherein said second separator means comprises a coalescer unit including a plurality of vertically spaced, substantially parallel corrugated baffle plates and said third separator means comprises a separation plate including a portion that slopes upwardly from said coalescer unit toward the second end of said tank.

18. An oil-water separator as claimed in claim 17, further including a divider member extending substantially vertically between said first separator means and said second separator means, said divider member being attached to said coalescer unit such that said divider member and said coalescer unit can be removed from said tank as a unit.

19. An oil-water separator as claimed in claim 17, further including a collection tube extending through and upwardly from an uppermost section of said separation plate.

20. A method of separating an oil-water mixture comprising:

introducing a flow of fluid initially containing oil and water into an upper portion of a first end of a tank;

directing the flow toward a sloped, corrugated surface of a baffle member positioned in the upper portion of the tank such that at least a substantial portion of the flow is directed over said corrugated surface to cause partial separation thereof by causing large oil globules to be separated from the flow;

directing the flow downward within the tank while enabling any heavy solids in the flow to drop and be contained within a sediment bucket positioned in a lower portion of the tank;

directing the flow upwardly and towards a second end of the tank between a plurality of vertically spaced, corrugated plates of a coalescer unit;

guiding the flow along an upward path toward the second end of the tank by means of a sloping separation plate mounted within the tank;

re-directing the flow in a downward and reverse direction toward an inlet opening of an outlet flow passage;

guiding the flow within the outlet flow passage such that the flow moves upwardly along the second end of the tank; and ejecting the flow from the tank through a discharge outlet.

* * * * *